(12) United States Patent
Kao et al.

(10) Patent No.: US 9,015,590 B2
(45) Date of Patent: Apr. 21, 2015

(54) MULTIMEDIA COMMENT SYSTEM AND MULTIMEDIA COMMENT METHOD

(71) Applicant: AverMedia Technologies, Inc., New Taipei (TW)

(72) Inventors: Jui-Hung Kao, Taipei Hsien (TW); Jiun-Kuei Jung, New Taipei (TW)

(73) Assignee: AverMedia Technologies, Inc., New Taipei (TW)

( * ) Notice: Subject to any disclaimer, the term of this patent is extended or adjusted under 35 U.S.C. 154(b) by 268 days.

(21) Appl. No.: 13/753,525

(22) Filed: Jan. 30, 2013

(65) Prior Publication Data

US 2014/0089800 A1    Mar. 27, 2014

(30) Foreign Application Priority Data

Sep. 25, 2012    (TW) .............. 101135124 A

(51) Int. Cl.
| | | |
|---|---|---|
| *G06F 17/24* | (2006.01) | |
| *H04N 21/4788* | (2011.01) | |
| *G06F 3/0481* | (2013.01) | |
| *G11B 27/00* | (2006.01) | |
| *G06F 17/30* | (2006.01) | |
| *H04N 21/475* | (2011.01) | |
| *G11B 27/034* | (2006.01) | |
| *G11B 27/34* | (2006.01) | |

(52) U.S. Cl.
CPC .............. *G06F 3/0481* (2013.01); *G11B 27/00* (2013.01); *G06F 17/30781* (2013.01); *H04N 21/4756* (2013.01); *G11B 27/034* (2013.01); *G11B 27/34* (2013.01); *G06F 17/241* (2013.01); *G06F 17/30858* (2013.01); *G06F 17/24* (2013.01); *H04N 21/4788* (2013.01)

(58) Field of Classification Search
CPC . G06F 17/241; G06F 17/24; G06F 17/30858; H04N 21/4788
USPC ........... 715/719, 723, 751, 753, 756; 386/278
See application file for complete search history.

(56) References Cited

U.S. PATENT DOCUMENTS

| | | | | |
|---|---|---|---|---|
| 7,716,376 | B1* | 5/2010 | Price et al. ................. | 709/248 |
| 8,207,990 | B1* | 6/2012 | DeSimone et al. .......... | 345/630 |
| 2004/0001079 | A1* | 1/2004 | Zhao et al. .................. | 345/719 |
| 2012/0151347 | A1* | 6/2012 | McClements, IV .......... | 715/716 |
| 2012/0284635 | A1* | 11/2012 | Sitrick et al. ................ | 715/751 |
| 2013/0204675 | A1* | 8/2013 | Dobell ......................... | 705/7.42 |

* cited by examiner

*Primary Examiner* — Ting Lee
(74) *Attorney, Agent, or Firm* — CKC & Partners Co., Ltd.

(57) ABSTRACT

A multimedia comment system and a multimedia comment method are disclosed herein. The multimedia comment system includes a video unit and a comment unit. The video unit can provide a video content for a client device. The comment unit can make the client device render a multimedia comment interface related to the video content, in which the multimedia comment interface has a multimedia comment button. When a commentator selects the multimedia comment button, the comment unit allows the commentator to perform operation of a multimedia comment on the video content.

12 Claims, 3 Drawing Sheets

MULTIMEDIA COMMENT SYSTEM AND MULTIMEDIA COMMENT METHOD

RELATED APPLICATIONS

This application claims priority to Taiwan Application Serial Number 101135124, filed Sep. 25, 2012, which is herein incorporated by reference.

BACKGROUND

1. Technical Field

The present disclosure relates to comment systems and comment methods, and more particularly, multimedia comment systems and multimedia comment methods.

2. Description of Related Art

Nowadays, video content websites have become more popular. In general, many people search for and comment on video contents in the video content websites.

However, the comments in current video content websites, such as YouTube, are limited to pure text. If a user wants to submit a multimedia comment (e.g., graphics, sound, images, and even animation) about a video content to the video content website, he or she only uses post-production software to process the video content after downloading the video content and then re-uploads the processed video content to the video content website. In this manner, there are some disadvantages as follows. First, the video content must be re-downloaded and re-uploaded, and therefore time and bandwidth are wasted. Second, there is no relationship between the re-uploaded video content and original video content, and it is difficult for another viewer to find out a correlation between these two individual video contents and hard to replay the multimedia comment. Third, there is no relationship among different multimedia comments because the different multimedia comments are individual video contents, and therefore discussion threads of the different multimedia comments cannot be established. Fourth, whenever a multimedia comment is added, the corresponding video content file must be added, and therefore the detrimental increase of storage space linearly depends on the addition of the multimedia comments. Fifth, whenever a viewer watches any multimedia comment, he or she must re-download the corresponding video content file, thus wasting the viewer's time and bandwidth.

In view of the foregoing, there still exist some inconveniences and defects in conventional video content websites that await further improvement. However, those skilled in the art sought vainly for a solution. Accordingly, there is an urgent need in the related field to solve or circumvent above problems and disadvantages.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to a multimedia comment system and a multimedia comment method for solving or circumventing aforesaid problems.

According to one embodiment of the present invention, a multimedia comment system comprises a video unit and a comment unit. The video unit provides at least one video content for a client device through a network. The comment unit makes the client device render a multimedia comment interface related to the video content, wherein the multimedia comment interface has at least one multimedia comment button, and the comment unit allows a commentator to perform operation of a multimedia comment on the video content when the commentator selects the multimedia comment button.

When the multimedia comment button is selected, the comment unit makes the video content pause and provides a transparent layer for covering the video content, so that the commentator can edit a multimedia comment object on the transparent layer.

The multimedia comment object is selected from a group consisting of a text, a figure, an image, a sound and a video.

Attribute data of the multimedia comment object at least records a time point that the video content pauses.

The multimedia comment system further comprises a database. The database stores the multimedia comment object on the transparent layer, wherein the comment unit makes the client device render a field of the multimedia comment according to the multimedia comment object of the database, and when the field is selected by a viewer, the video content starts to play at the time point and meanwhile plays the multimedia comment object on the transparent layer.

When the viewer selects the multimedia comment button, the comment unit allows the viewer to reply to the multimedia comment and establishes a reply relation in another transparent layer, so that the viewer can perform operation of another multimedia comment on aforesaid another transparent layer.

The comment unit provides a plurality of multimedia comment buttons that have various functions, and the multimedia comment buttons includes a plurality of multimedia function buttons and a plurality of object editing function buttons.

The multimedia function buttons includes a text button, a sound button, a video button, at least one figure button and a link/distribution button, and the object editing function buttons includes a deletion button, a recovery button, a saving button, a copy button and a combination/division button.

When the link/distribution button is selected, the comment unit allows the commentator to link a plurality of multimedia comment objects as a group of objects or distribute the group of objects into the plurality of multimedia comment objects.

The multimedia comment system further comprises a login unit. The login unit allows a user account of the commentator to log in, wherein when the combination/division button is selected, the comment unit allows the commentator to combine different transparent layers into a single one transparent layer or divide the single one transparent layer into the different transparent layers.

According to another embodiment of the present invention, a multimedia comment method comprising steps of: (a) providing at least one video content for a client device through a network; and (b) making the client device render a multimedia comment interface related to the video content, wherein the multimedia comment interface has at least one multimedia comment button, and the comment unit allows a commentator to perform operation of a multimedia comment on the video content when the commentator selects the multimedia comment button.

The step (b) comprises: making the video content pause and providing a transparent layer for covering the video content when the multimedia comment button is selected, so that the commentator can edit a multimedia comment object on the transparent layer.

The multimedia comment object is selected from a group consisting of a text, a figure, an image, a sound and a video.

Attribute data of the multimedia comment object at least records a time point that the video content pauses.

The multimedia comment method further comprises steps of: storing the multimedia comment object on the transparent layer; making the client device render a field of the multimedia comment according to the multimedia comment object of the database, wherein when the field is selected by a viewer, the video content starts to play at the time point and meanwhile plays the multimedia comment object on the transparent layer.

The multimedia comment method further comprises a step of allowing the viewer to reply to the multimedia comment and establishing a reply relation in another transparent layer when the viewer selects the multimedia comment button, so that the viewer can perform operation of another multimedia comment on aforesaid another transparent layer.

The step (b) comprises: providing a plurality of multimedia comment buttons that have various functions, and the multimedia comment buttons includes a plurality of multimedia function buttons and a plurality of object editing function buttons.

The multimedia function buttons includes a text button, a sound button, a video button, at least one figure button and a link/distribution button, and the object editing function buttons includes a deletion button, a recovery button, a saving button, a copy button and a combination/division button.

The multimedia comment method further comprises a step of: when the link/distribution button is selected, allowing the commentator to link a plurality of multimedia comment objects as a group of objects or separating the group of objects into the plurality of multimedia comment objects.

The multimedia comment method further comprises steps of: allowing a user account of the commentator to log in; when the combination/division button is selected, allowing the commentator to combine different transparent layers into a single one transparent layer or divide the single one transparent layer into the different transparent layers.

Technical advantages are generally achieved, by embodiments of the present invention, as follows:

1. There is no need to re-download and re-upload the video content, and therefore time and bandwidth are conserved;
2. There is a relationship between the multimedia comment and original video content, and a viewer can replay the multimedia comment;
3. There is a relationship among different multimedia comments, and it is easy for a user to replay the multimedia comment or to establish discussion threads of the different multimedia comments;
4. Whenever a multimedia comment is added, there is no need to add a corresponding video content file, and therefore the storage space are to conserved; and
5. Whenever a viewer watches any multimedia comment, there is no need to re-download the corresponding video content file, thus saving the viewer's time and bandwidth.

Accordingly, the user can simply and easily submit a multimedia comment about a video content to the present system through Internet. Compared with monotonous text comments, the multimedia comments can diversely and completely represent the user's opinions. The multimedia comments are stored with respect transparent layers and are independent of the original video content file. Therefore, each video content file is stored only once for conserving storage space, time and bandwidth.

The commentator can submit the multimedia comment on the video content without downloading and post-processing the multimedia comment, and thus the timeliness and convenience are increased. The multimedia comments not only provide recreation for the viewers, but also enhance the value of the video content.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
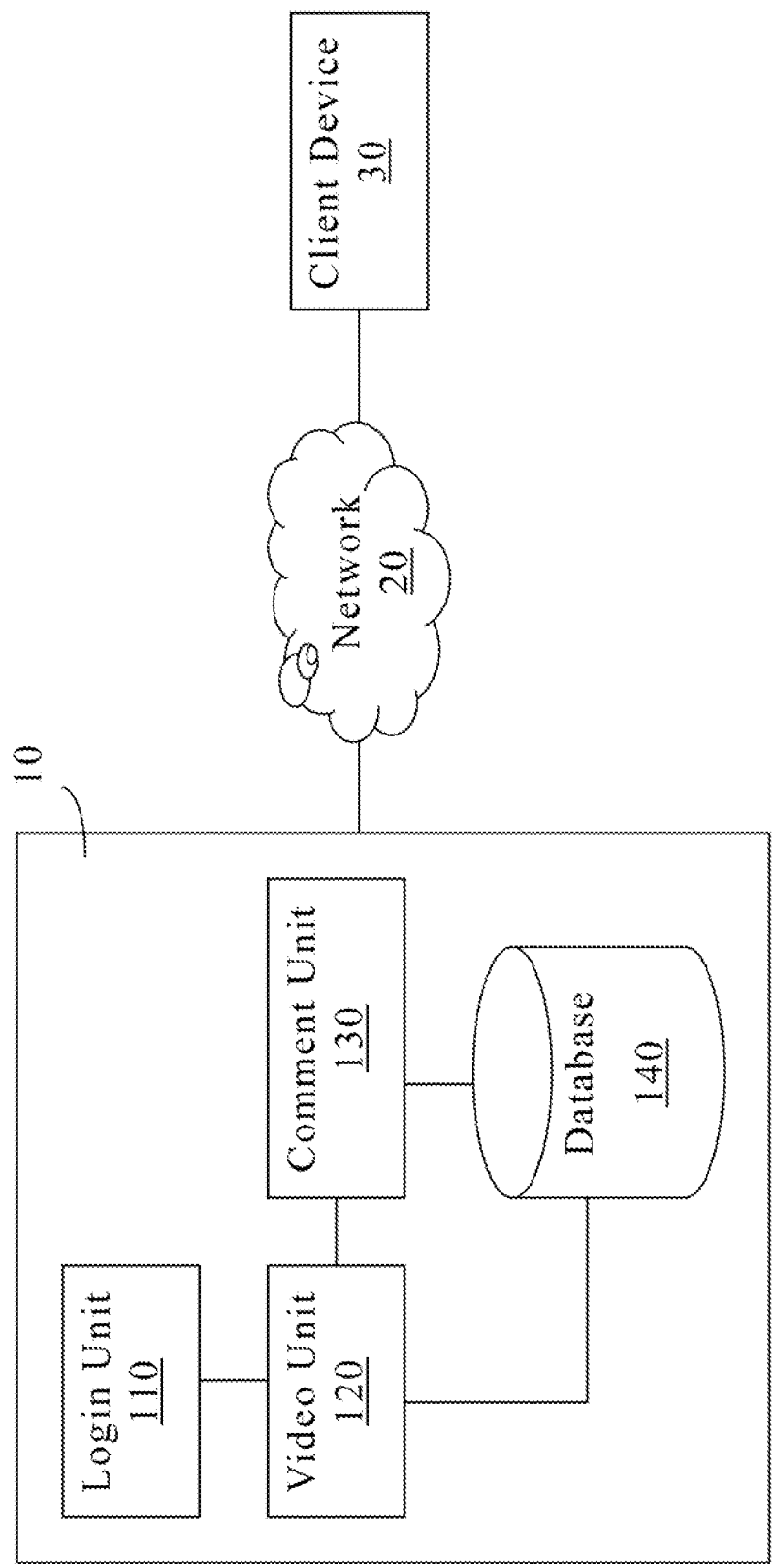
FIG. 1 is a block diagram of a multimedia comment system according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one aspect, the present disclosure is directed to a multimedia comment system. This system may be easily integrated into a multimedia comment website and may be applicable or readily adaptable to all technologies. Compared with the conventional pure-text comments, the multimedia comments provide recreation for the viewers and enhance the value of the video content. Herewith the multimedia comment system is illustrated by reference to the following description considered in FIGS. 1-2.

FIG. 1 is a block diagram of a multimedia comment system 10 according to one embodiment of the present disclosure. As shown in FIG. 1, the multimedia comment system 10 is connected to a client device 30 through a network 20, where the network 20 may be Internet or another wired/wireless network, and the client device 30 may be a PC, a tablet computer, a mobile phone or the like. In use, a user can utilize the client device 30 to communicate with the multimedia comment system 10, so as to watch and comment about video contents.

The multimedia comment system 10 includes a login unit 110, a video unit 120, a comment unit 130 and a database 140. When a user utilizes the client device 30 to communicate with the multimedia comment system 10, the login unit allows a user account of the user (e.g., a commentator, a viewer, or the like) to log in and performs verification on the user account. The video unit 120 provides at least one video content for the client device 30, so that the user can watch the video content by utilizing the client device 30. The comment unit 130 makes the client device 30 render a multimedia comment interface related to the video content, in which the multimedia comment interface has at least one multimedia comment button, and the comment unit allows a commentator to perform operation of a multimedia comment on the video content when the commentator selects (e.g., clicks or touches) the multimedia comment button. In this way, there is no need to re-download and re-upload the video content, and therefore time and bandwidth are conserved.

Figure 2:
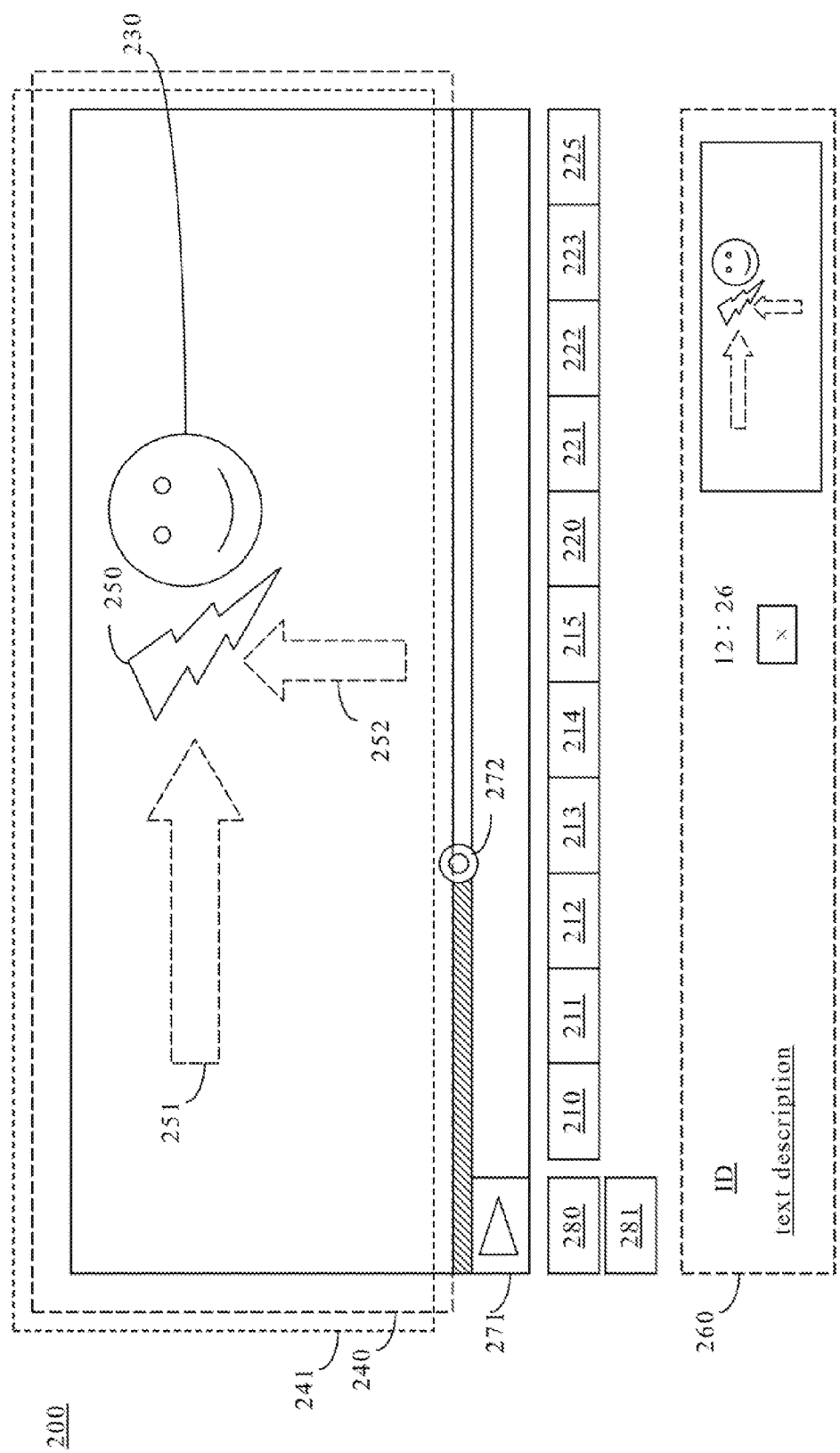
FIG. 2 is a schematic diagram of a multimedia comment interface according to one embodiment of the present disclosure.

For a more complete understanding of the multimedia comment, and the advantages thereof, refer to FIGS. 1-2. The multimedia comment interface 200 may directly render on WebPages or may be provided by a browser's add-ons. As shown in FIG. 2, a video content Web Page has a set of multimedia comment buttons 210-225. When the video content 230 is playing and when any one of the multimedia comment buttons is selected, the comment unit 130 makes the video content 230 pause and provides a transparent layer 240 for covering the video content 230, so that the commentator can edit the multimedia comment objects 250-252 on the transparent layer 230. In this way, whenever one multimedia comment is added, one corresponding transparent layer is added, and there is no need to add a video content file. Therefore, the storage space is conserved.

In practice, the multimedia comment object is selected from a group consisting of a text, a figure, an image, a sound and a video. For example, the figure may be a line, a box, a color block or the like; the image may be a photograph, a digital image or the combinations thereof; the sound may be the commentator's recording, background music or the like; the video may be an animation, a motion pictures recorded by a video camera or the like. Those with ordinary skill in the art may flexibly choose the objects depending on the desired application. In this way, the user can simply and easily submit a multimedia comment about a video content to the present system through Internet. Compared with monotonous text comments, the multimedia comments can diversely and completely represent the user's opinions.

Moreover, the attribute data of the multimedia comment objects 250 and 251 can records their attribute descriptions, such as length, width, shape, size, color or the like, and also includes a time point that the video content 230 pauses and a screenshot of the video content 230 at the time point, where the time point can serves as a time moment of inserting the multimedia comment.

In one embodiment, when pressing one multimedia comment button, the user can edit one multimedia comment object (e.g., the multimedia comment object 250) on the transparent layer 240. Then, when the user presses the same or another multimedia comment button or performs another operation being irrelevant to the multimedia comment, the multimedia comment object 250 on the transparent layer 240 can be stored in the database 140, as shown in FIG. 1. Also, the multimedia comment objects 251 and 252 on the transparent layer 240 can be edited and stored in a similarly manner, and, thus, are not repeated herein.

Since the types of the multimedia comment buttons 210-225 are various, the multimedia comment buttons 210-225 have various functions. In one embodiment, the multimedia comment buttons 210-225 includes a plurality of multimedia function buttons 210-216 and a plurality of object editing function buttons 220-225. The multimedia function buttons includes a text button 210, a sound button 211, a video button 212, one or more figure button (e.g., a line button 213, a box button 214 and a color button 215) and a link/distribution button 216. The object editing function buttons includes a deletion button 220, a recovery button 221, a saving button 222, a copy button 223 and a combination/division button 225. By pressing the multimedia function buttons, the user can line, input text, insert a dialog box, color, pinup picture, add sound recording, add background music, adjust the size of the multimedia position, adjust the length of time of multimedia, link/distribute multimedia objects . . . etc. By pressing the object editing function buttons, the user can delete, recover, save and copy the multimedia objects or save one multimedia object as another object.

Moreover, the multimedia comment interface 200 may render a like button 280 and a dislike button 281. In one embodiment, when the user select the like button 280, the comment unit 130 add one to the number of supporters of the video content 230; on the contrary, when the user select the dislike button 281 the comment unit 130 add one to the number of opponents of the video content 230.

When the video content 230 is playing and when any one of the multimedia comment buttons is selected, the video content 230 pauses. But, the user can press a play button 271 to proceed to play the video content or select a time bar 272 for fine-tuning the time point of the video content 230, so as to determine a time moment of inserting the multimedia comment and a screenshot of the video content 230.

By pressing the multimedia function buttons 210, 213, 214 and 215, a line, a text, a dialog box, a picture, a sound, and/or another multimedia comment object can be added in the transparent layer. The line, the text, the dialog box, the picture and the sound may be individual multimedia comment objects. When the link/distribution button 216 is selected, the comment unit 130 allows the commentator to link a plurality of multimedia comment objects as a group of objects or distribute the group of objects into the plurality of multimedia comment objects.

When the sound button 211 is pressed, the video content 230 starts to play and a microphone of the client device 30 records sound. Then, when the sound button 211 is pressed again, this recorded sound is stored as a sound comment object. When the video button 212 is pressed, the client device 30 uploads a video to the system, and the video is rendered on the transparent layer 240.

One multimedia comment object may be deleted by pressing the deletion button 220. A previous editing action may be recovered by pressing the recovery button 221. The multimedia comment may be stored and submitted to the transparent layer 240 by pressing the saving button 222, in which the stored data includes a time that the video content 230 currently plays, a currently suspended screen of the video content 230 with a screenshot of the multimedia comment, the multimedia comment on the transparent layer 240, a Web address of the video content 230, the user account (i.e., ID) of the commentator, a storage time of the multimedia comment, and a serial number of the multimedia comment.

After multimedia comment are stored, the comment unit 130 makes the client device 30 render a field 260 of the multimedia comment according to the multimedia comment objects 250-252 of the database 140. For example, the field 260 of the multimedia comment may be arranged at a lower position of the video content websites, as shown in FIG. 2. In one embodiment, the field 260 of the multimedia comment may have information, such as the user account (i.e., ID) of the commentator, the screenshot of the multimedia comment, a text description of the multimedia comment, the time point of the multimedia comment of the video content (e.g., "12:26" in FIG. 2), the number of supporters and the number of opponents.

The commentator can combine different transparent layers of his or her user account into a single one transparent layer by pressing the combination/division button 225 to select a certain of the transparent layers and to give a group name of the certain of the transparent layers. Since one transparent layer belongs to one group, the commentator can divide aforesaid single one transparent layer into the different transparent layers by pressing the combination/division button 225 to cancel above selection.

The commentator can selects the field 260 of his or her multimedia comment and then accesses the transparent layer 240 for modification. After the modification, the storage time of the multimedia comment is updated. The multimedia comment has a deletion button (x), as shown in FIG. 2, and the commentator can delete his or her multimedia comment by pressing the deletion button (x).

When a viewer selects the field 260, the video content 230 starts to play at the time point and meanwhile plays the multimedia comment objects 250-252 on the transparent layer 240, where the video content 230 is covered with the transparent layer 240.

When watching the multimedia comment, the viewer can press any multimedia comment button to submit his or her comment. In one embodiment, when the viewer selects (e.g., clicks or touches) any multimedia comment button, the comment unit 130 allows the viewer to reply to the commentator's multimedia comment and establishes a reply relation in another transparent layer 241, so that the viewer can perform operation of another multimedia comment 252 on aforesaid another transparent layer 241. Accordingly, the reply relation between the commentator's multimedia comment and the viewer's multimedia comment is established and stored in the new transparent layer 241. Thus, there is a relationship among different multimedia comments, and it is easy for a user to replay the multimedia comment or to establish discussion threads of the different multimedia comments. Furthermore, when replaying the commentators multimedia comment, the viewer can press the copy button 223 to copy all objects of the commentators multimedia comment and further to edit these objects on the viewer's transparent layer, so as to reduce the editing period.

The viewer can choose a sequencing of different comments. For example, first, the sequencing of different comments depends on the submitting time of the multimedia comments; second, the sequencing of different comments depends on the user accounts; third, the sequencing of different comments depends on the time points of the multimedia comments; fourth, the sequencing of different comments depends on the reply relations; Fifth, the numbers of the supporters; sixth, the sequencing of different comments depends on the number of the opponents.

The login unit 110, the video unit 120 and the comment unit 130 may be hardware, software, and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The database 140 may be stored in different data storage devices or in the same data storage device, such as a computer hard disk, a server, an external hard disk, or another computer-readable storage medium.

Figure 3:
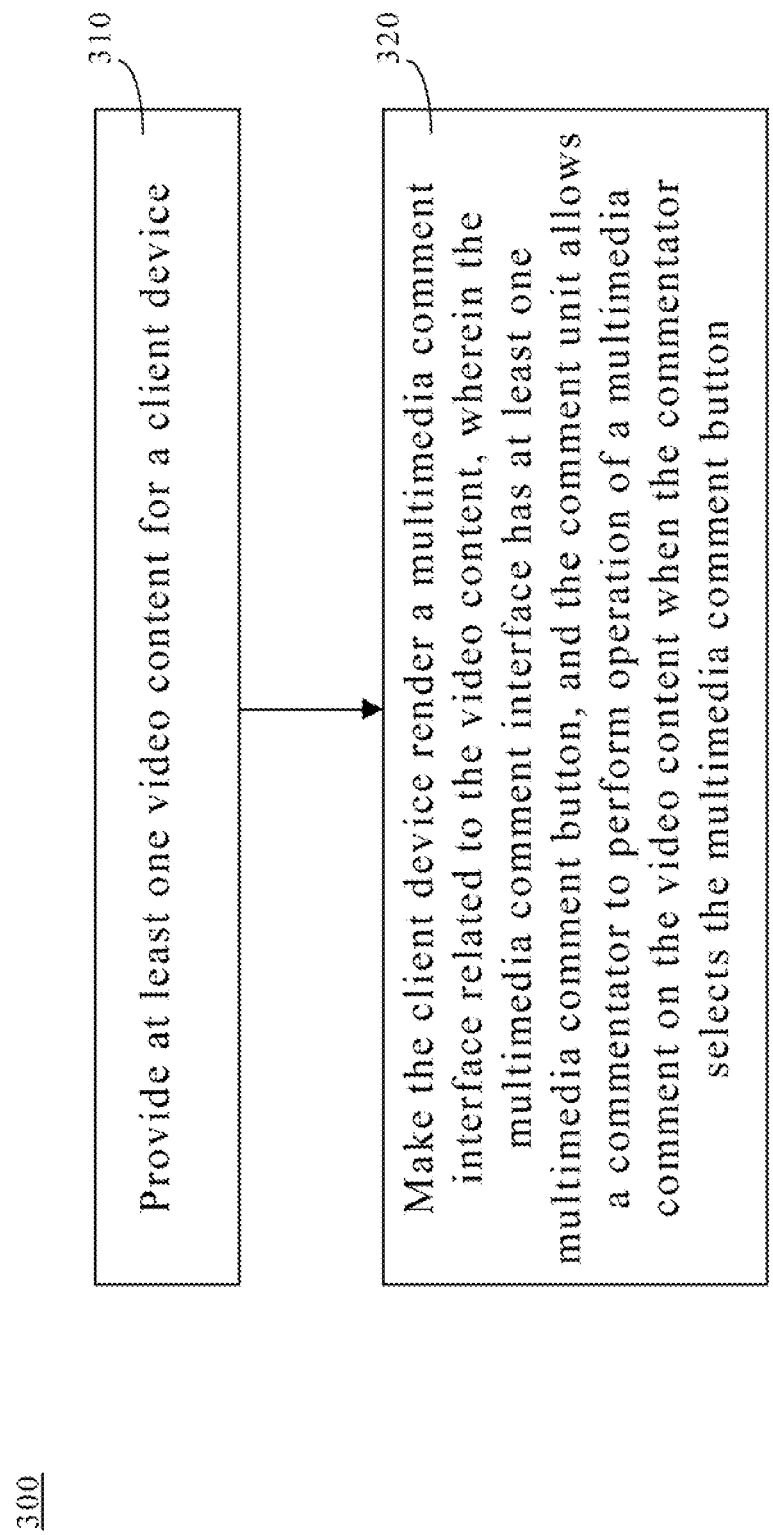
FIG. 3 is a flow diagram of a multimedia comment method according to one embodiment of the present disclosure.

FIG. 3 is a flow diagram of a multimedia comment method 300 according to one embodiment of the present disclosure. As shown in FIG. 3, the multimedia comment method 300 comprises steps 310 and 320 as follows (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

Step 310 is to provide at least one video content for a client device through a network. Step 320 is to make the client device render a multimedia comment interface related to the video content, wherein the multimedia comment interface has at least one multimedia comment button, and the comment unit allows a commentator to perform operation of a multimedia comment on the video content when the commentator selects the multimedia comment button. Compared with the conventional pure-text comments, the multimedia comments provide recreation for the viewers and enhance the value of the video content. Moreover, there is no need to re-download and re-upload the video content, and therefore time and bandwidth are conserved In step 320, when the multimedia comment button is selected, the video content pauses and the video content is covered with a transparent layer, so that the commentator can edit a multimedia comment object on the transparent layer. In this way, whenever one multimedia comment is added, one corresponding transparent layer is added, and there is no need to add a video content file. Therefore, the storage space are conserved In the multimedia comment method 300, the multimedia comment object is selected from a group consisting of a text, a figure, an image, a sound and a video. In this way, the user can simply and easily submit a multimedia comment about a video content to a video content website through the present method 300. Compared with monotonous text comments, the multimedia comments can diversely and completely represent the user's opinions.

In the multimedia comment method 300, attribute data of the multimedia comment object at least records a time point that the video content pauses.

The multimedia comment method 300 may further comprise steps of: storing the multimedia comment object on the transparent layer, in which the multimedia comments are stored with respect transparent layers and are independent of the original video content file, and therefore each video content file is stored only once for conserving storage space, time and bandwidth; then, making the client device render a field of the multimedia comment according to the multimedia comment object of the database, wherein when the field is selected by a viewer, the video content starts to play at the time point and meanwhile plays the multimedia comment object on the transparent layer. Thus, whenever a viewer watches any multimedia comment, there is no need to re-download the corresponding video content file, thus saving the viewer's time and bandwidth.

The multimedia comment method 300 may further comprise a step of allowing the viewer to reply to the multimedia comment and establishing a reply relation in another transparent layer when the viewer selects the multimedia comment button, so that the viewer can perform operation of another multimedia comment on aforesaid another transparent layer. Thus, there is a relationship among different multimedia comments, and it is easy for a user to replay the multimedia comment or to establish discussion threads of the different multimedia comments Step 320 comprises: providing a plurality of multimedia comment buttons that have various functions, and the multimedia comment buttons includes a plurality of multimedia function buttons and a plurality of object editing function buttons.

In the multimedia comment method 300, the multimedia function buttons includes a text button, a sound button, a video button, at least one figure button and a link/distribution button, and the object editing function buttons includes a deletion button, a recovery button, a saving button, a copy button and a combination/division button.

The multimedia comment method 300 may further comprise a step of: when the link/distribution button is selected, allowing the commentator to link a plurality of multimedia comment objects as a group of objects or separating the group of objects into the plurality of multimedia comment objects.

The multimedia comment method 300 may further comprise a step of: allowing a user account of the commentator to log in; when the combination/division button is selected, allowing the commentator to combine different transparent layers into a single one transparent layer or divide the single one transparent layer into the different transparent layers.

It should be noted that those implements to perform the steps in the multimedia comment method 300 are disclosed in above embodiments and, thus, are not repeated herein.

The multimedia comment method 300 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A multimedia comment system comprising:
    a client device comprising a processor and a computer readable storage medium;
    a video unit for providing at least one video content for the client device through a network;
    a comment unit for making the client device render a multimedia comment interface related to the video content, wherein the multimedia comment interface has at least one multimedia comment button, and the comment unit allows a commentator to perform operation of a multimedia comment on the video content when the commentator selects the multimedia comment button,
        wherein when the multimedia comment button is selected, the comment unit makes the video content pause and provides a transparent layer for covering the video content, so that the commentator can edit a multimedia comment object on the transparent layer,
        wherein the comment unit provides a plurality of multimedia comment buttons that have various functions, and the multimedia comment buttons includes a plurality of multimedia function buttons and a plurality of object editing function button,
        wherein the multimedia function buttons includes a text button, a sound button, a video button, at least one figure button and a link/distribution button, and the object editing function buttons includes a deletion button, a recovery button, a saving button, a copy button and a combination/division button; and
    a login unit for allowing a user account of the commentator to log in, wherein when the combination/division button is selected, the comment unit allows the commentator to combine different transparent layers into a single one transparent layer or divide the single one transparent layer into the different transparent layers.

2. The multimedia comment system of claim 1, wherein the multimedia comment object is selected from a group consisting of a text, a figure, an image, a sound and a video.

3. The multimedia comment system: of claim 1, wherein attribute data of the multimedia comment object at least records a time point that the video content pauses.

4. The multimedia comment system of claim 3, further comprising:
    a database for storing the multimedia comment object on the transparent layer, wherein the comment unit makes the client device render a field of the multimedia comment according to the multimedia comment object of the database, and when the field is selected by a viewer, the video content starts to play at the time point and meanwhile plays the multimedia comment object on the transparent layer.

5. The multimedia comment system of claim 4, wherein when the multimedia comment button is selected by the viewer, the comment unit allows the viewer to reply to the multimedia comment and establishes a reply relation in another transparent layer, so that the viewer can perform operation of another multimedia comment on the another transparent layer.

6. The multimedia comment system of claim 1, wherein when the link/distribution button is selected, the comment unit allows the: commentator to link a plurality of multimedia comment objects as a group of objects or distribute the group of objects into the plurality of multimedia comment objects.

7. A multimedia comment method comprising steps of:
   (a) providing at least: one video content for a client device through a network;
   (b) making the client device render a multimedia comment interface related to the video content, wherein the multimedia comment interface has at least one multimedia comment button, and the comment unit allows a commentator to perform operation of a multimedia comment on the video content when the commentator selects the multimedia comment button,
   wherein the step (b) comprises:
      making the video content pause and providing a transparent layer for covering the video content when the multimedia comment button is selected, so that the commentator can edit a multimedia comment object on the transparent layer; and
      providing a plurality of multimedia comment buttons that have various functions, and the multimedia comment buttons includes a plurality of multimedia function buttons and a plurality of object editing function buttons,
         wherein the multimedia function buttons includes a text button, a sound button, a video button, at least one figure button and a link/distribution button, and the object editing function buttons includes a deletion button, a recovery button, a saving button, a copy button and a combination/division button
   (c) allowing a user account of the commentator to log in; and
   (d) when the combination/division button is selected, allowing the commentator to combine different transparent layers into a single one transparent layer or divide the single one transparent layer into the different transparent layers.

8. The multimedia comment method of claim 7, wherein the multimedia comment object is selected from a group consisting of a text, a figure, an image, a sound and a video.

9. The multimedia comment method of claim 7, wherein attribute data of the multimedia comment object at least records a time point that the video content pauses.

10. The multimedia comment method of claim 9, further comprising:
   storing the multimedia comment object on the transparent layer; and
   making the client device render a field of the multimedia comment according to the multimedia comment object of the database, wherein when the field is selected by a viewer, the video content starts to play at the time point and meanwhile plays the multimedia comment object on the transparent layer.

11. The multimedia comment method of claim 10, further comprising:
   allowing the viewer to reply to the multimedia comment and establishing a reply relation in another transparent layer when the multimedia comment button is selected by the viewer, so that the viewer can perform operation of another multimedia comment on the another transparent layer.

12. The multimedia comment method of claim 7, further comprising:
   when the link/distribution button is selected, allowing the commentator to link a plurality of multimedia comment objects as a group of objects or separating the group of objects into the plurality of multimedia comment objects.

\* \* \* \* \*